US006202503B1

United States Patent
Miller

(10) Patent No.: US 6,202,503 B1
(45) Date of Patent: Mar. 20, 2001

(54) DEVICE FOR ADJUSTING A TWO-PART GEAR LEVER

(75) Inventor: Lars Miller, Södertälje (SE)

(73) Assignee: Scania CV Aktiebolag (SE)

( * ) Notice: Subject to any disclaimer, the term of this patent is extended or adjusted under 35 U.S.C. 154(b) by 0 days.

(21) Appl. No.: 09/367,759

(22) PCT Filed: Dec. 16, 1998

(86) PCT No.: PCT/SE98/02334

§ 371 Date: Aug. 19, 1999

§ 102(e) Date: Aug. 19, 1999

(87) PCT Pub. No.: WO99/34997

PCT Pub. Date: Jul. 15, 1999

(30) Foreign Application Priority Data

Dec. 22, 1997 (SE) .................................................. 9704804

(51) Int. Cl.[7] .................................................. G05G 5/08
(52) U.S. Cl. .................... 74/525; 74/473.34; 74/524; 74/548; 403/4
(58) Field of Search ............................... 74/473.34, 523, 74/524, 525, 548; 403/3, 4, 94

(56) References Cited

U.S. PATENT DOCUMENTS

| 1,547,819 | * | 7/1925 | Paul ........................................ 74/524 |
| 1,552,408 | | 9/1925 | Anderson . |
| 1,719,368 | * | 7/1929 | Hibbets ................................... 74/524 |
| 1,743,241 | | 1/1930 | Schmidt ................................. 74/524 |
| 4,541,257 | * | 9/1985 | Stoll ....................................... 74/523 |
| 4,569,246 | * | 2/1986 | Katayama et al. ..................... 74/523 |
| 4,603,598 | * | 8/1986 | Tsuji et al. ............................. 74/523 |
| 4,960,009 | * | 10/1990 | Schultz et al. ........................ 74/523 |
| 5,328,285 | | 7/1994 | Grubbs et al. ......................... 403/66 |
| 6,029,535 | * | 2/2000 | Kenny et al. .......................... 74/524 |
| 6,082,216 | * | 7/2000 | Watanabe et al. ..................... 74/523 |

FOREIGN PATENT DOCUMENTS 439464   6/1985   (SE) .

* cited by examiner

Primary Examiner—David A. Bucci
Assistant Examiner—Chang H. Kim
(74) Attorney, Agent, or Firm—Ostrolenk, Faber, Gerb & Soffen, LLP

(57) ABSTRACT

Arrangement for manual resetting of the mutual positional setting of an upper lever element (6) and a lower lever element (8) connected articulatedly to the latter, which lever elements together form a two-part gear lever (2) supported articulatedly in a vehicle. The lower end of the upper lever element (6) has fastened in it a guide sleeve (18) which is supported for rotation on a supporting spindle mounted in a holder yoke (22) which is fastened in the upper end of the lower lever element (8) and which has sidewalls (24, 26) and a reference wall (28) which not only connects these sidewalls but also has a position fixing portion (30). Between the lever elements (6, 8) there is a locking mechanism (32) which normally prevents mutual movement of the lever elements (6, 8). The locking mechanism includes a setting sleeve (34) which is supported for rotation and longitudinal movement on the upper lever element (6) and which at the bottom firmly supports a setting crown (36) which has position fixing protrusions (38, 40, 42, 44) which are separated in the circumferential direction of the crown and are situated at different radial distances from the centreline (46) of the upper lever element. By resetting of the crown (36) a desired position fixing protrusion can be brought into position-fixing locking engagement with the position fixing portion (30) of the holder (22).

8 Claims, 2 Drawing Sheets

DEVICE FOR ADJUSTING A TWO-PART GEAR LEVER

The present invention concerns an arrangement for manually altering the mutual position setting of a first part and a second part of a two-part gear lever mounted articulatedly in a vehicle, where the first part is an upper lever element and the second part is a lower lever element articulatedly connected to the upper lever element by means of a link which incorporates a first articulating device fastened in the lower end of the upper lever element and articulatedly connected to a second articulating device fitted at the upper end of the lower lever element, while a locking mechanism operative between the lever elements normally prevents mutual movement of the lever elements. On a two-part gear lever provided with such an arrangement it is possible to alter the mutual angular position between the lever elements which together constitute the gear lever.

STATE OF THE ART

A known practice is to provide, for example, trucks with two-part gear levers consisting of an upper gear lever element which has its lower end articulatedly connected to the upper end of a lower gear lever element. This means that during the use of a vehicle fitted with the two-part gear lever the two lever elements have fixed mutual positioning (i.e. are locked in position relative to one another) by means of a locking mechanism or locking arrangement situated between them which, in its activated locking position, prevents mutual movement between the gear lever elements. The whole gear lever consisting of two lever elements is usually mounted movably in the vehicle either in a special lever stand under the floor of the driving cab or in an element connected to the engine/gearbox. The point on the two-part gear lever at which the latter is supported in the vehicle is usually situated in the region of the lower gear lever element and allows resetting (pivoting) of the gear lever about two mutually perpendicular geometrical axes so that the driver can operate the gear lever both in the longitudinal direction of the vehicle and in its transverse direction in order to select desired changes of gear in the gearbox.

Such a two-part gear lever design is previously known from, for example, Swedish patent specification 8103461-3. However, the latter concerns a gear lever arrangement particularly intended for cab-over-engine trucks in which it has to be possible for the driving cab to be tilted forwards so that the engine and gearbox (which are situated under the driving cab) become accessible for servicing/repair. This entails the problem that the gear lever constitutes an obstacle to tilting the driving cab forwards, a problem which has to be solved by resorting to special constructional solutions. According to that patent specification, the gear lever therefore takes the form of a two-part lever with the two lever elements fixed mutually in position by means of a releasable locking mechanism operative between them.

The locking function of this locking mechanism can nevertheless be neutralized when tilting the cab forwards, whereby the upper lever element can be tilted forwards. To this end, the locking mechanism is provided with a disengaging device which, when the cab is tilted forwards, is acted upon, by a special element fastened to the cab, so that the locking function of the locking mechanism is neutralized.

OBJECT OF THE INVENTION

The design of the working environment in which the driver of a motor vehicle is when driving the vehicle has been the subject of increased interest over recent years. This applies especially to the environment in the driving cab of a utility vehicle such as a truck, since the environment in such a driving cab constitutes the workplace in which the vehicle driver often spends many hours of his working day.

There are numerous reasons for attaching ever increasing importance to trying to achieve as good a working environment as possible in utility vehicles. One very important reason is of course the constant endeavour to increase traffic safety. It is in particular a well-known fact that a driver working in a good driving cab environment is a significantly better driver from the traffic safety point of view than a driver in a bad cab environment. It is therefore important, for example, that the driving cab be properly sound-insulated and that the air temperature in the driving cab can be maintained at a pleasant level. It is also very important that the driver sits comfortably in the driving seat so that he does not suffer from "body fatigue" even during long periods of driving. A great deal of effort has therefore been devoted to making driving seats in trucks as comfortable as possible. Modern vehicle seats therefore afford many degrees of freedom with regard to setting the seat and its various parts. Ergonomic thinking applies, however, not only to driving seat design but also to, for example, the design and location of instruments and controls in the driving cab and relative to the driving seat.

The present invention is primarily focused on problems pertaining to the placing and location of the gear lever in the longitudinal direction in the driving cab, i.e. longitudinally relative to the driver/driving seat, and, in this context, particularly the location of the gripping part of the gear lever (the gear lever knob) in the initial situation before gear engagement, i.e. the basic setting position (neutral position) of the gear lever. Drivers who differ in physique, arm length, shoulder width etc. have the right to expect the gear lever to be nevertheless located in an optimum manner relative to the driving seat, and this demand for optimum setting cannot be met merely by altering the setting of the driving seat, since a change in the position of the seat relative to the gear lever may conflict with the setting of the seat relative to, for example, the pedals.

DESCRIPTION OF THE INVENTION

In an arrangement of the kind indicated in the introduction, the abovementioned problems can be solved by the arrangement exhibiting the features characterized in that the first articulating device is a guide sleeve mounted for rotation on the second articulating device consisting of a supporting spindle fitted in a hole which is fastened in the upper end of the lower lever element and which has sidewalls and a reference wall which not only connects these sidewalls but also has a position fixing portion, and that the locking mechanism includes a setting sleeve which is supported for rotation and longitudinal movement on the upper lever element, can be gripped by the driver and has fastened in its lower portion a setting crown with at least two position fixing protrusions which are separate in the circumferential direction of the crown, are placed at different radial distances from the centerline of the upper lever element and are intended to be able, through resetting of the crown, to be brought into position-fixing locking engagement as desired with the position fixing position of the holder.

A distinguishing feature of such an arrangement is that the first articulating device is a guide sleeve mounted for rotation on the second articulating device which takes the form of a supporting spindle fitted in a holder which is fastened in the upper end of the lower gear element and has sidewalls and a reference wall which not only connects these sidewalls but also has a position fixing portion. At the same time, the locking mechanism includes a setting sleeve which is supported for rotation and longitudinal movement on the upper lever element, can be gripped by the driver and has fastened in its lower portion a setting crown with at least two position fixing protrusions which are separate in the circumferential direction of the crown. These protrusions are situated at different radial distances from the centreline of the upper lever element and are intended to be able, by resetting of the crown, to be brought into desired position-fixing locking engagement with position fixing portions of the holder. On a two-part gear lever provided with an arrangement according to the invention, the position of the gripping part of the gear lever (the gear lever knob at the upper end of the upper gear lever element) can thus be adjusted in the longitudinal direction of the vehicle, i.e. in a longitudinal direction parallel with the driving seat, by raising, turning and lowering the setting sleeve (with associated setting crown) which is mounted for rotation and longitudinal movement on the upper lever element. The position fixing protrusions being placed at different radial distances from the centreline of the upper lever element means that the selection of the position fixing protrusion which is brought into engagement with the position fixing portion of the holder will determine the angular position of the upper lever element relative to the holder in the upper end of the lower lever element and hence relative to the lower lever element. The driver therefore carries out the desired resetting of the upper lever element relative to the lower lever element by taking hold of the setting sleeve and pulling it upwards so that the operative position fixing protrusion is disengaged from the position fixing portion of the holder, followed by another position fixing protrusion, selected instead, being rotated into position directly above the reference wall of the holder before the setting sleeve is moved straight down so that the newly selected position fixing protrusion is brought into locking engagement with the position fixing portion of the holder.

Further developments and advantageous embodiments of the arrangement are described below.

The holder in which the supporting spindle is fitted may advantageously exhibit the features wherein the holder consists of a metal yoke fastened to the outside of a bearing sleeve at the upper end of the lower lever element, and the metal yoke has not only a planar and substantially rectangular web which forms the reference wall but also two mutually parallel flanges which protrude from opposite side edges of the web and constitute the sidewalls of the holder, and wherein the supporting spindle is fitted in a pair of coaxially situated holes passing through the flanges of the yoke. The setting crown firmly connected to the setting sleeve exhibits with advantage the features wherein the setting crown fastened in the lower portion of the setting sleeve is made of metal and has a radially expanded end portion which bears the position fixing protrusions and which has a planar end surface perpendicular to the centerline of the setting sleeve, from which end surface the position fixing protrusions protrude in the axial direction of the sleeve, and wherein the setting crown is provided with at least three, preferably at least four, position fixing protrusions and each fixing protrusion includes an outer portion which has a reference surface facing inwards towards the outside of the gear lever element which runs through the setting crown, and that at least some or several of the fixing protrusions incorporate not only the outer portion but also an opposite inner portion which is arranged at a distance radially within the outer portion and which together with the latter delineates a position fixing recess into which the position fixing portion of the reference wall fits. In practice it will probably be preferable for the setting crown supporting the setting sleeve not to be arranged loose on the upper gear element but to be urged downwards towards the holder, with which the setting crown will be in position-fixing locking engagement via the position fixing protrusion which the driver has selected for locking engagement. Certain constructional embodiments according to claims 6–9 may therefore, for various reasons, be advantageous, namely (a) that a helicoidal preload spring arranged about the upper lever element and bearing on a retaining device attached to the latter urges the setting sleeve supporting the setting crown towards an end position stop device which protrudes from the lever element, preferably takes the form of a locating pin and can, through resetting of the crown, be caused to abut at will against the bottom of any of a number of radial strop recesses formed in the setting crown, (b) that the radial stop recesses are formed in the planar end surface on the expanded end portion of the setting crown, and each stop recess is situated between a pair of position fixing protrusions which are mutually adjacent in the circumferential direction, (c) that the retaining device attached to the upper lever element consists of a retaining nut arranged for screwing on the outside of the lever element, and (d) that the preload spring is inserted between a spacing sleeve, which is firmly attached to the part of the upper lever element directed away from the link and is preferably made of plastic, and a circular flange portion which is formed at the lower end of the setting sleeve, runs round the inside of the latter and abuts against the outside of the lever element, whereby the setting sleeve, which is also preferably made of plastic, encloses the preload spring and has its upper end portion supported for telescopic movement on the outside of the spacing sleeve. Finally, the arrangement will in practice probably be oriented in the driving cab for a vehicle and relative to the longitudinal direction of the vehicle, wherein the supporting spindle is at least approximately directed transverse to the longitudinal direction of the vehicle, whereby resetting the setting crown to change the selected position fixing protrusion which is in locking engagement with the position fixing portion of the holder entails altering the mutual angular setting of the gear lever elements in the vertical longitudinal direction place on the vehicle, with a consequent relocation in the longitudinal direction of the vehicle, of the upper end of the upper lever element which bears the gripping part of the gear lever.

BRIEF DESCRIPTION OF THE DRAWINGS

The position setting arrangement according to the invention is described and further explained below with reference to the attached drawings which schematically depict embodiments of the arrangement and its associated components and constructional details.

The drawings are as follows.

Figure 1:
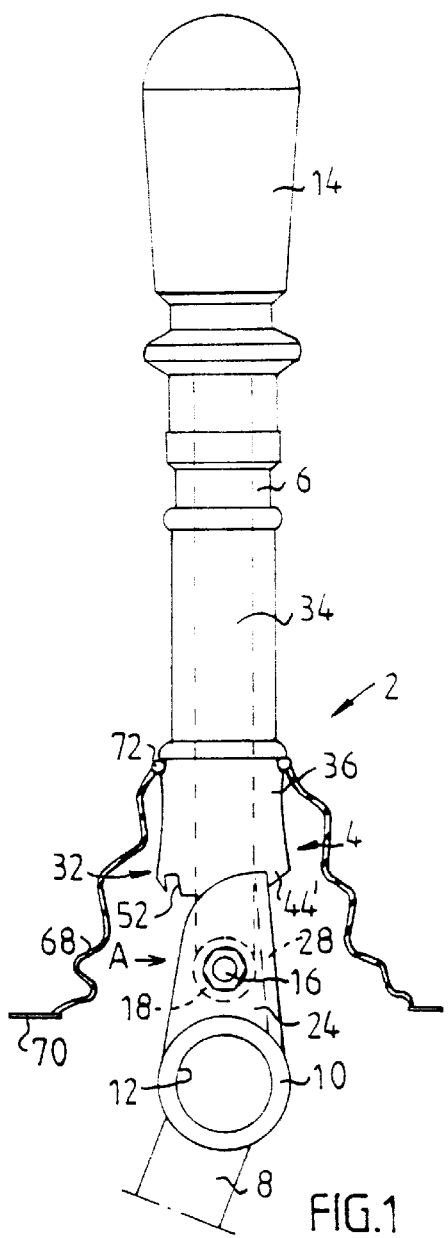
FIG. 1 shows a schematic side view of an embodiment of a two-part gear lever provided with a position setting arrangement according to the invention.
Figure 5:
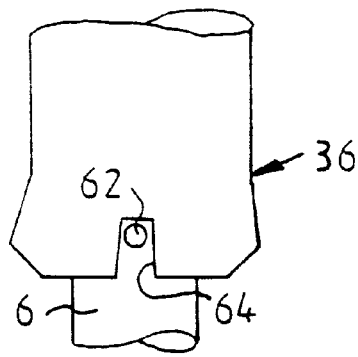
Figure 6:
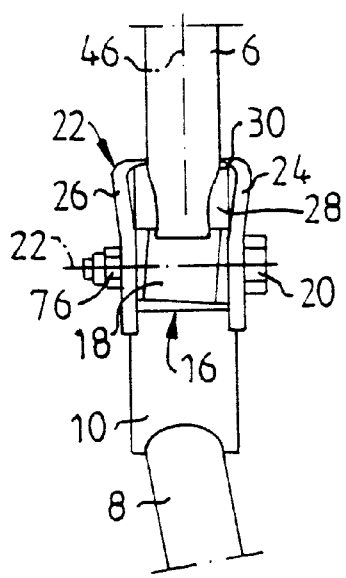

FIG. 5 shows schematically a portion of the upper lever element in the region of the lower portion of the setting crown and an end position stop device which cooperates therewith and takes the form of a locating pin;

FIG. 6 shows the articulated connection between the upper and lower lever elements according to FIG. 1, depicts the upper lever element without the surrounding setting sleeve and associated setting crown, and shows the link in direction A in FIG. 1.

DESCRIPTION OF AN EMBODIMENT

FIG. 1 shows a two-part gear lever which is designated as a whole by reference notation 2 and is provided with a position setting arrangement 4 according to the present invention. The gear lever 2, which is intended for a motor vehicle such as a truck, is composed of a first, upper, gear lever element 6 and, connected to the latter settably in the longitudinal direction of the vehicle and articulatedly, a second, lower, gear lever element 8. The gear lever 2 as a whole is intended, in a conventional manner, to be pivotably supported for movement in the vehicle by means of a universal joint in a lever stand under the floor of the vehicle of the driving cab or in an element belonging to the gearbox. All that is depicted of this universal joint in FIG. 1 and FIG. 6 is a bearing sleeve 10 which is firmly welded in the upper portion of the lower lever element 8 and is intended to be supported by an undepicted supporting journal extending through the aperture 12 of the sleeve 10. The sleeve 10 is supported on this undepicted supporting journal by means of obliquely adjustable bearings, e.g. ball bearings. The lower portion (not depicted in FIG. 1 and FIG. 6) of the lower lever element 8 is intended, in a conventional manner, to be articulatedly connected to, for example, a gearchange rod which acts upon a gearshift mechanism belonging to the gearbox of the vehicle.

The upper gear lever element 6 provided at the top with a gripping part or gear lever knob 14 is connected articulatedly and settably to the lower gear lever element 8 by a hingelike link 16 comprising two articulating devices, one of them being a first articulating device 18 fastened in the lower end of the upper lever element 6, the other a second articulating device which is fitted to the upper end of the lower lever element 8 and takes the form of a supporting spindle which may with advantage be constituted by a supporting bolt with a head 20 and a centreline 22. The first articulating device takes the form in this case of a guide sleeve 18 which is firmly welded in the lower end of the upper lever element 6 and is thus mounted for rotation on said supporting spindle/bolt with the centreline 22. This supporting spindle is fitted in a holder 22 which is fastened in the upper end of the lower lever element 8 and which has sidewalls 24, 26 and a reference wall 28 which not only connects these sidewalls but also has an upper position fixing portion 30. The holder 22 takes the form in this case of a metal yoke firmly welded to the outside of the bearing sleeve 10 at the upper end of the lower lever element 8. The metal yoke's planar and substantially rectangular web which connects the yoke's sidewalls 24, 26 thus forms the reference wall 28. The supporting spindle provided with head 20 is fitted in a pair of coaxially situated holes which run through the sidewalls 24, 26 of the holder 22 which takes the form of a yoke, and these sidewalls form largely parallel flanges which protrude from opposite side edges of the rear reference wall 28.

The position setting arrangement 4 according to the invention makes it possible for the vehicle driver to alter manually the mutual positional setting of the upper lever element 6 and the lower lever element 8 which is articulatedly connected to the latter (by the link 16). In order to prevent mutual movement of the lever elements 6, 8 in normal situations (when their mutual positional setting is intended to be fixed) there is a locking mechanism (general reference notation 32) operative between the lever elements.

This locking mechanism 32 includes a setting sleeve 34 which is mounted for rotation and longitudinal movement on the upper lever element 6 and has fastened in its lower end (see FIGS. 1–3) a setting crown 36 with, in this case, four position fixing protrusions 38, 40, 42 and 44 which are separate in the circumferential direction of the crown. These position fixing protrusions are placed at different radial distances from the centreline 46 of the upper lever element 6 and are intended to be able, through resetting (raising, turning and lowering) of the setting crown 36, to be brought into position-fixing locking engagement as desired with the position fixing portion 30 of the holder 22.

Figure 4:
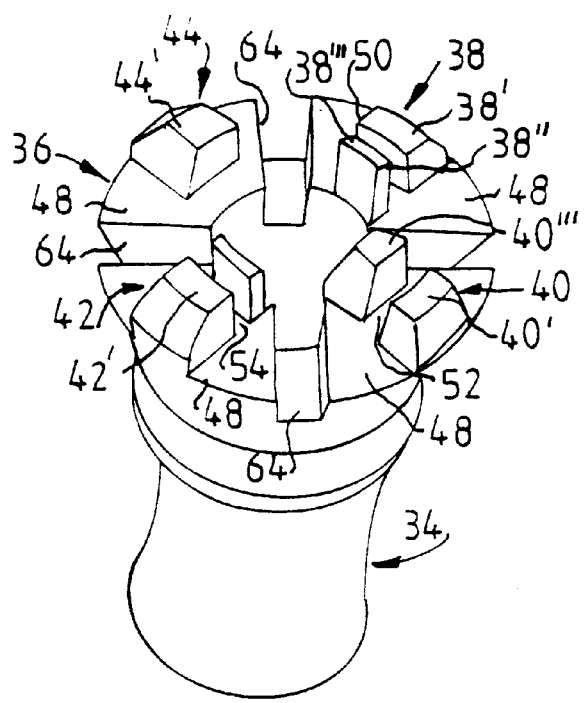
FIG. 4 shows a perspective representation of an embodiment of a setting sleeve of the kind depicted in FIGS. 1–3 provided with a setting crown, and the setting sleeve/setting crown are viewed obliquely from below in order to show clearly the position fixing protrusions of the setting crown.

For more detailed consideration of the position fixing protrusions 38, 40, 42, 44 at the bottom of the setting crown 36, reference should now be made to FIG. 4 which shows the resetting unit consisting of the setting sleeve 34 and the setting crown 36 turned upside down so as to show clearly the position fixing protrusions and the more detailed placing of each within its quadrant of the setting crown's planar end surface 48. The setting crown 36, made of metal, is therefore firmly attached to the lower end of the setting sleeve 34, which can be gripped and operated by the driver, is preferably made of plastic and may be provided with a knurled surface region on the outside. The setting crown 36 has a conically expanded end portion 51 from whose planar end surface 48 the position fixing protrusions 38, 40, 42 and 44 protrude in the axial direction of the sleeve/crown. The end surface 48 is perpendicular to the common centreline 46 of the upper lever element 6 and the setting sleeve 34. The fixing protrusions 38, 40, 42 and 44 each include respective outer portions 38', 40', 42' and 44' with respective planar reference surfaces 38", 40", 42" and 44" facing inwards towards the outside of the gear lever element 6 which runs through the setting crown 36. Three of the fixing protrusions (viz. 38, 40 and 42) include in addition to their respective outer portions 38' etc. respective opposite inner portions 38''', 40''' and 42''' which are arranged at a distance radially within the respective outer portions and delineate in conjunction with the latter respective position fixing recesses 50, 52 and 54 into which the position fixing portion 30 of the reference wall 28 fits. Resetting the setting crown 36 so that the desired position fixing recess 50, 52 or 54 comes into position fixing engagement with the position fixing portion 30 of the wall 28 thus brings about the desired angular setting between the upper lever element 6 and the lower lever element 8. With regard to position fixing protrusion 44 (which has no opposite inner portion), position setting engagement with the position fixing portion 30 of the wall 28 is only brought about by reference surface 44" abutting against the rear 30' of the position fixing portion 30, as illustrated in FIG. 2.

In the embodiment of the setting crown 36 depicted in FIG. 4, it may be seen that position fixing protrusions 38 and 42 are identically alike, i.e. their outer portions 38' and 42' are equal in size and their inner portions 38''' and 42''' are equal in size. It follows that position setting by means of either of protrusions 38 and 42, i.e. with either recess 50 or recess 54 engaging with the position fixing portion 30 of the reference wall 28, results in the same mutual position of the upper lever element 6 and the lower lever element 8. Opting instead to use position fixing protrusion 40 (and hence recess 52 between outer portion 40' and inner portion 40''' for engagement with the position fixing portion 30) results in the upper lever element 6 being placed in its maximum "tilted forward" position relative to the lower lever element 8, whereas using position fixing protrusion 44 for the setting results in the minimum "tilted forward" position of the lever element 6 relative to the lever element 8. This setting position is depicted schematically in FIG. 1 and FIG. 2. If the setting position by means of protrusion 38 or protrusion 42 is called the intermediate or neutral position for the setting of the upper lever element relative to the lower one, the setting position determined by protrusion 40 may be called the maximum forward position, in which case the position determined by protrusion 44 may be called the maximum rearward position.

It is of course not necessary to have exactly four position fixing protrusions which according to the version described above can provide three different setting positions of the upper and lower lever elements. Examples of possible alternatives include a version whereby four position fixing protrusions provide four different setting positions, in which case the inner portions of the position fixing protrusions need to be all of different sizes. The lack of inner portions of protrusions then constitutes a possible "protrusion inner portion size". It is also possible to conceive of versions with, for example, two, three, five or more position fixing protrusions creating the possibility of corresponding numbers of mutual position settings for the upper and lower lever elements.

Figure 2:
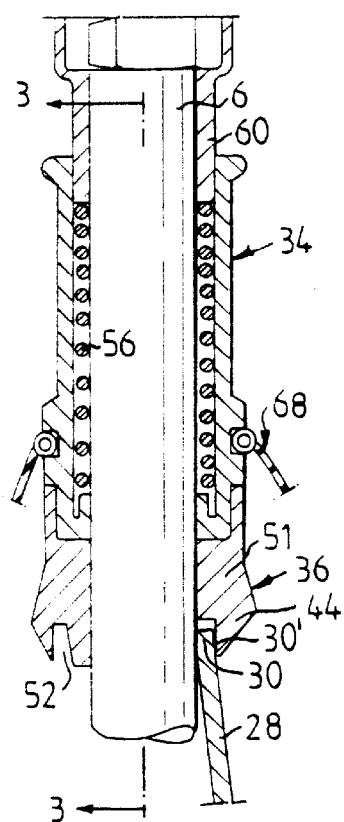
FIG. 2 shows a partial longitudinal section through a section of the gear lever depicted in FIG. 1 and parts of the associated position setting arrangement.
Figure 3:
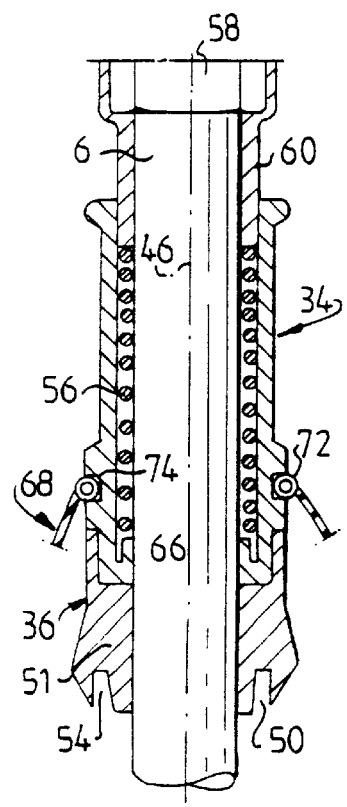
FIG. 3 shows a partial longitudinal section along the section line 3—3 in FIG. 2.

Reference will now be made to FIGS. 2–3 in which it may be seen that the setting crown 36 supporting the setting sleeve 34 is urged towards the holder 22 by a preload spring 56 which is arranged about the upper lever element 6 and which bears, via an intermediate plastic spacing sleeve 60, on a retaining device 58 attached to the upper lever element 6. The retaining device may with advantage consist of a retaining nut arranged for screwing on the outside of the lever element 6.

Axial movement of the setting sleeve 34 and the setting crown 36 by the preload spring 56 along the upper lever element 6 is limited not only by the position fixing portion 30 but also by an end position stop device in the form of a locating pin 62 which is fastened radially into the lever element 6 and can be caused to abut against the bottom of any of four radial stop recesses 64 which are formed in the setting crown and separate the latter's four quadrants. The radial stop recesses 64 are therefore formed in the planar end surface 48 of the setting crown's expanded end portion 50, and each such stop recess 64 therefore separates a pair of mutually adjacent position fixing protrusions.

As illustrated in FIGS. 2–3, the preload spring 56 is inserted between, at one end, the spacing sleeve 60 abutting on the retaining nut 58 and, at the other end, a preferably axially slit circular flange portion 66 which runs round the inside of the lower end of the setting sleeve and abuts resiliently against the outside of the lever element 6. The setting sleeve 34 therefore encloses the preload spring 56 and has its upper end portion supported for telescopic movement on the outside of the spacing sleeve 60.

As may be seen in FIGS. 1–3, a leather gaiter 68 is fitted between the floor 70 of the driving cab and the outside of the setting sleeve 34 so that the circular upper edge portion 72 of the gaiter is fastened in a circular recess 74 in the shell surface of the setting sleeve.

Finally, it should be noted that the supporting spindle (with centreline 22) in the form of a supporting bolt with head 20 and locknut 76 is in practice at least approximately directed transverse to the longitudinal direction of the vehicle, whereby the driver resetting the setting crown 36 by using his hand to grip the setting sleeve 34 (for selection of the desired position fixing protrusion to be placed in locking engagement with the position fixing portion 30 of the holder 22) alters the mutual angular setting of the elements 6, 8 of the gear lever 2 in the vertical longitudinal direction plane of the vehicle. Resetting the setting crown 36 therefore relocates in the longitudinal direction of the vehicle the upper end of the upper lever element 6, which bears the gripping part 14 of the gear lever 2.

What is claimed is:

1. Apparatus for manually altering the mutual position setting of a first part and second part of a two-part gear lever mounted articulatedly in a vehicle where said first part is an upper lever element having a longitudinal centerline and said second part is a lower lever element articulately connected to the upper lever element by means of a link, said link including a first articulating device fixed to the lower end of the upper lever element and a second articulating device fixed to the upper end of the lower lever element, said first and second articulating devices being coupled together, and a locking mechanism operative between said lever elements which normally prevents mutual movement of said lever elements, the improvement wherein said second articulating device comprises a holder having spaced-apart sidewalls and a reference wall which connects said sidewalls and which has a position-fixing portion and a supporting spindle extending between said sidewalls, said first articulating device comprises a guide sleeve rotatably mounted about said supporting spindle on said second articulating device, and wherein said locking mechanism comprises a setting sleeve mounted for rotational and longitudinal movement on said upper lever element, said sleeve having a lower portion comprising a setting crown having at least two position-fixing protrusions which are spaced from each other circumferentially and are spaced at different radial distances from said centerline of said upper lever element, whereby said setting sleeve is movable downward for its setting crown to engage said position-fixing portion of said holder to thereby fix the position of said upper lever element relative to said lower lever element, said guide sleeve being rotatable before being movable downward for determining which of its position-fixing protrusions will engage said position-fixing portion of said holder, where said different radial distances of said position fixing protrusions correspond to different angular positions of said upper and lower lever element respectively when said setting sleeve engages said holder.

2. Apparatus according to claim 1 wherein said holder comprises a bearing sleeve fixed to said upper end of said lower lever element, and a metal yoke fixed to the outside of said bearing sleeve, said metal yoke having a web which forms a reference wall and two mutually parallel flanges which protrude from opposite side edges of said web and constitute sidewalls of said holder.

3. Apparatus according to claim 2 wherein said supporting spindle extends through a pair of coaxially situated holes extending through said flanges of said yoke.

4. Apparatus according to claim 1 wherein said setting crown at said lower portion of said setting sleeve and has a radially expanded end portion which has a planar end surface perpendicular to said centerline of said setting sleeve and from which end surface said position-fixing protrusions protrude in the axial direction of said sleeve.

5. Apparatus according to claim 4 further comprising wherein said setting crown comprises at least three position-fixing protrusions each of which includes an outer portion having a reference surface facing inward toward the outside of said gear lever element, and for at least some of said position-fixing protrusions the protrusion comprises an outer portion and an opposite inner portion which is situated at a distance radially within said outer portion and which together with said outer portion delineates a position-fixing recess into which said position fixing portion of said reference wall is insertable.

6. Apparatus according to claim 5 wherein said setting crown further comprises a plurality of radial stop recesses spaced around said planar end surface, said apparatus further comprising an end position stop device which protrudes from said upper lever element and a helicoidal preload spring arranged about said upper lever element, said spring urging said setting sleeve toward said end position stop device, whereby said crown can be caused to abut selectively against any of said radial stop recesses.

7. Apparatus according to claim 6 wherein said radial stop recesses are formed in said planar surface on said expanded end portion of said setting crown, and each of said stop recesses is situated between a pair of position fixing protrusions which are mutually adjacent in the circumferential direction.

8. Apparatus according to claim 1 wherein said supporting spindle is directed transversely to the longitudinal direction of the vehicle, whereby resetting the crown to change the selected position-fixing protrusion which is in locking engagement with the position fixing portion of the holder entails altering the mutual angular setting of the gear lever elements, with a consequent relocation in the longitudinal direction of the upper end of the upper lever element.

* * * * *